R. REID.
GUIDE MAP.
APPLICATION FILED JAN. 10, 1912.

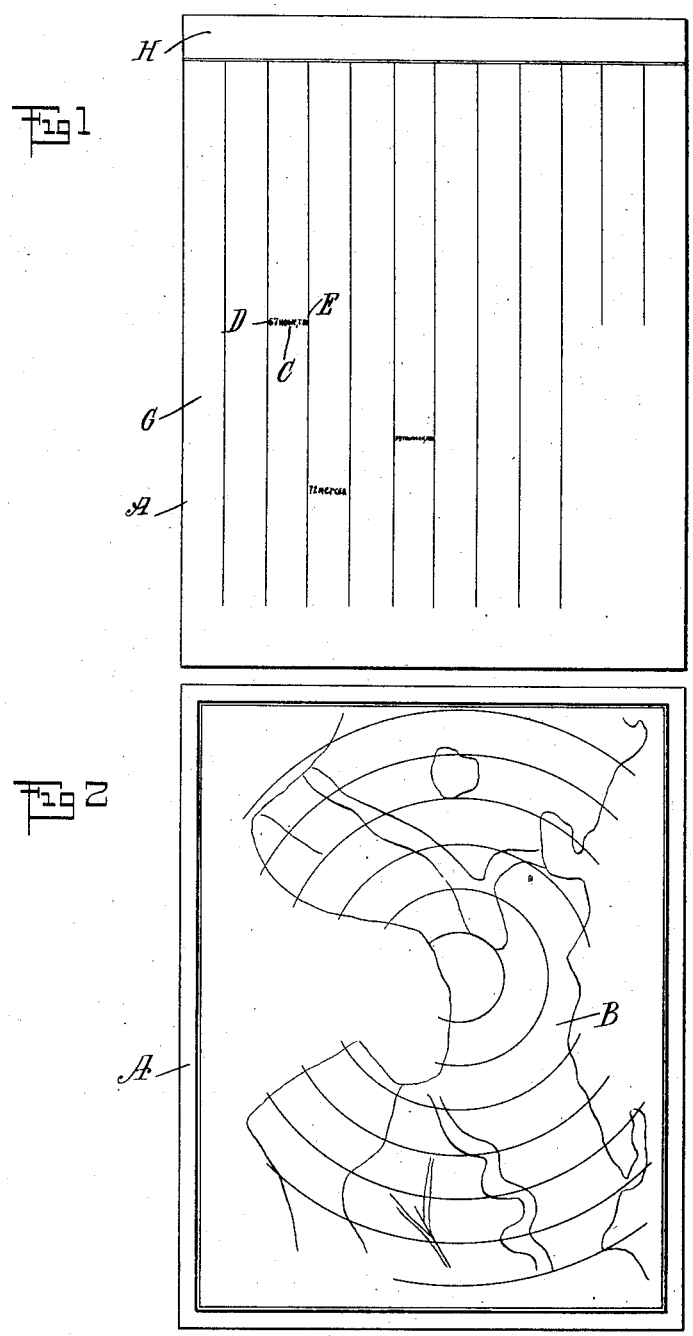

1,037,984.

Patented Sept. 10, 1912.

2 SHEETS—SHEET 2.

WITNESSES
C. J. Hachenberg

INVENTOR
Robert Reid
BY Munn & Co
ATTORNEYS

UNITED STATES PATENT OFFICE.

ROBERT REID, OF VICTORIA, BRITISH COLUMBIA, CANADA.

GUIDE-MAP.

1,037,984.  Specification of Letters Patent.  Patented Sept. 10, 1912.

Application filed January 10, 1912. Serial No. 670,480.

*To all whom it may concern:*

Be it known that I, ROBERT REID, a subject of the King of Great Britain, and a resident of Victoria, in the Province of British Columbia and Dominion of Canada, have invented a new and Improved Guide-Map, of which the following is a full, clear, and exact description.

The invention relates to guide maps of cities and other places, and preferably though not exclusively such as are issued periodically, and the object is to provide a new and improved guide map arranged to permit a user to readily find a desired street or other point on the map. For the purpose mentioned, use is made of a sheet of paper, provided on the front face with a map and having on its back the names of the streets and other places pertaining to the said map, each name being flanked by an index character and a location key, and means for penetrating, denting or otherwise marking the sheet from the back at that point, located with the help of the said location key to visibly indicate the desired point on the front face of the sheet.

A practical embodiment of the invention is represented in the accompanying drawings forming a part of this specification, in which similar characters of reference indicate corresponding parts in all the views.

Figure 3:
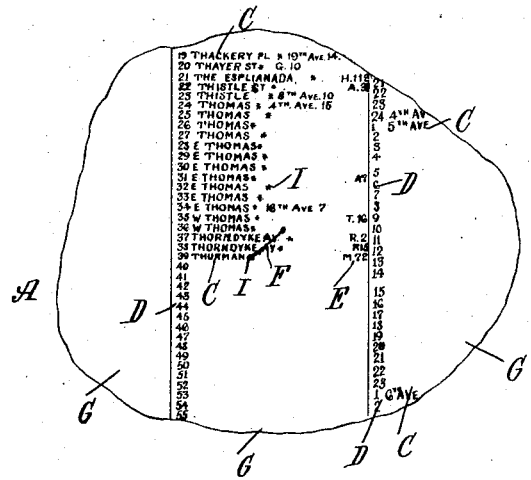

Figure 1 is a plan view of the back of the guide map; Fig. 2 is a like view of the front of the guide map; Fig. 3 is an enlarged plan view of a portion of the back of the guide map; and Fig. 4 is a like view of a corresponding portion of the front of the guide map.

On the front face of a sheet A of paper or other suitable material is printed or otherwise produced a map B of a city or other place, and on the back of the sheet A are printed the names C of the streets and other places depicted on the map B, the names being preferably arranged in series in alphabetical order, each series containing the names of the streets with the same initial letter of the alphabet, and with the names in each series are associated index numerals D, preferably running consecutively and placed to the left of the names, as shown in Figs. 1 and 3. To the right of each name C is arranged a location key E formed of a letter of the alphabet, and a numeral, of which the letter of the alphabet refers to the initial letter of the same or another series of streets and the numeral refers to the index number of the said series. Thus in 57 Howe T 39, shown in Fig. 1, the name of the street is Howe and belongs to the H series, and 57 is the index number of this series; T 39 is the location key, of which T is the initial letter of the names of the streets in the series which begin with a T, and 39 is the index number of a particular street of this series.

Figure 4:
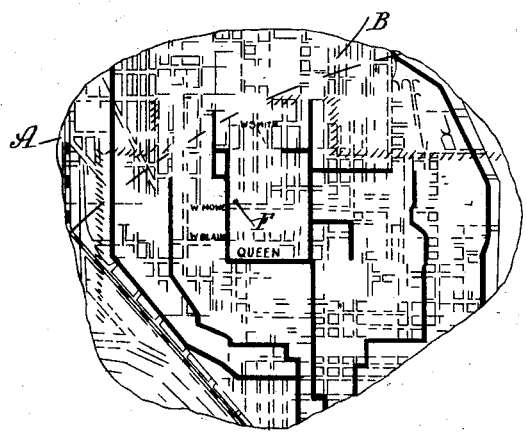

The map A outlined in Figs. 2 and 4 is that of Seattle, Washington, and the names of the streets are printed on the back and are preferably arranged in columns to facilitate the finding of any particular street by the use of the guide map. The top of the back of the sheet above the columns G is provided with a heading H for containing directions pertaining to the use of the guide map. The star or other figure I is preferably arranged at each street name for indicating the exact point at which the needle F or other suitable tool is to penetrate, dent or otherwise mark the sheet A.

Presuming that Howe street is to be located by the user of the guide map, it is only necessary to first find the name "Howe" on the back of the map and to note the location key, which in this case is T 39. The user now finds 39 along the T series of street names to locate "39 Thurman M 72" and the sheet is now punctured or otherwise marked at the end of the name "Thurman" by the pin or other suitable tool F, so that the point of the pin or the dent appears on the front face of the sheet A at the map B and at a point in the immediate neighborhood of Howe st. depicted on the map, as will be readily understood by reference to Figs. 3 and 4. In case it is desired to locate on the map B "Thurman st." then the user first finds "Thurman" in the T series of names and notes the location key, which in this case is "M 72" and indicates that the user is to find the name of the street beginning with M and having as an index the numeral 72, and then the user penetrates the sheet at the said street name, which in this case is Mercer st. (not shown).

It is understood that the user of the map can readily locate the point of the pin F on the face of the map B and thus find the name and location of the desired street on the map B.

It is understood that the guide map shown and described is preferably one that is issued periodically for the use of travelers and other parties visiting a city or other place, and which guide map is not intended for constant and permanent use for any great length of time.

Having thus described my invention, I claim as new and desire to secure by Letters Patent:

1. A guide map, comprising a sheet provided on one face with a map, columns of street names arranged on the other side of the map, indicating means associated with the said names to locate any street at an opposite point on the back of the map, and means for marking the sheet from the back at the said point to locate the street on the face of the map.

2. A guide map, comprising a sheet provided on the front face with a map, street names, indexes and location keys on the back of the map and depending one on the other and corresponding to the matter depicted on the front face, and means for marking the sheet from the back at any point determined by the said names, indexes and location keys to visibly indicate the point on the front face of the map.

3. A guide map, comprising a sheet, a map on the front face of the sheet, the names of the streets depicted by the said map being arranged in series on the back of the sheet, the names in each series being consecutively numbered, and a location key associated with each name.

4. A guide map, comprising a sheet, a map on the front face of the sheet, the names of the streets depicted by the said map being arranged in series on the back of the sheet, the names in each series being consecutively numbered, and a location key associated with each name and consisting of a letter of the alphabet, and a numeral, of which the letter of the alphabet refers to another series of names and the numeral to the particular name in this series.

In testimony whereof I have signed my name to this specification in the presence of two subscribing witnesses.

ROBERT REID.

Witnesses:
 WALTER W. TAYLOR,
 W. G. BECKTELL.

---

Copies of this patent may be obtained for five cents each, by addressing the "Commissioner of Patents, Washington, D. C."